United States Patent [19]

Bodin et al.

[11] Patent Number: 5,553,911
[45] Date of Patent: Sep. 10, 1996

[54] HEAVY DUTY MOTOR VEHICLE CAB SUSPENSION

[75] Inventors: Jan-Olof Bodin, Alingsas, Sweden; Steve L. Barnhardt, High Point, N.C.; Nils B. Nilsson, Gothenburg; Mats H. Andersson, Molndal, both of Sweden

[73] Assignee: Volvo GM Heavy Truck Corporation, Greesboro, N.C.

[21] Appl. No.: 356,475

[22] Filed: Dec. 15, 1994

[51] Int. Cl.⁶ .................................................. B62D 33/06
[52] U.S. Cl. .................... 296/190; 180/89.12; 180/89.13; 188/129; 248/562; 248/581
[58] Field of Search .................. 188/129, 381; 296/190, 35.1; 180/89.12, 89.13; 248/562, 581, 614, 609, 635; 267/203

[56] References Cited

U.S. PATENT DOCUMENTS

| | | | |
|---|---|---|---|
| 2,705,634 | 4/1955 | Sampson et al. | 267/203 |
| 3,044,799 | 7/1962 | Fiala | 280/112 |
| 3,089,710 | 5/1963 | Fiala | 280/112 |
| 3,554,596 | 1/1971 | Fevre | 296/28 |
| 3,667,565 | 6/1972 | Steiner et al. | 296/190 X |
| 3,799,481 | 3/1974 | Anderson | 248/635 |
| 3,841,694 | 10/1974 | Merkle | 296/35 R |
| 3,882,956 | 5/1975 | Pleget | 180/89 A |
| 3,944,017 | 3/1976 | Foster | 180/89 A |
| 3,966,009 | 6/1976 | Meacock, II et al. | 180/89 A |
| 4,033,607 | 7/1977 | Cameron | 280/711 |
| 4,043,585 | 8/1977 | Yamanaka | 296/35 R |
| 4,082,343 | 4/1978 | Hart, II et al. | 296/28 C |
| 4,235,470 | 11/1980 | Kauss et al. | 296/190 |
| 4,271,921 | 6/1981 | Ochsner | 180/89.12 |
| 4,275,918 | 6/1981 | Franco | 296/190 |
| 4,330,149 | 5/1982 | Salmon | 296/190 |
| 4,418,955 | 12/1983 | Muncke et al. | 296/190 |
| 4,438,825 | 3/1984 | Stephens | 180/89.12 |
| 4,438,970 | 3/1984 | Boucher | 296/190 |
| 4,451,079 | 5/1984 | Takahashi | 296/190 |
| 4,452,328 | 6/1984 | Oudelaar | 180/89.14 |
| 4,452,329 | 6/1984 | Stone et al. | 180/89.15 |
| 4,470,477 | 9/1984 | Marjoram | 180/89.14 |
| 4,483,409 | 11/1984 | Fun | 180/89.15 |
| 4,735,272 | 4/1988 | Sjoetrom et al. | 180/89.14 |
| 4,807,713 | 2/1989 | Smith et al. | 180/89.14 |
| 4,819,980 | 4/1989 | Sakata et al. | 296/35.1 |
| 4,871,189 | 10/1989 | Van Breemen | 280/711 |
| 4,989,684 | 2/1991 | Conaway | 180/89.15 |
| 4,998,592 | 3/1991 | Londt et al. | 180/89.12 |
| 5,024,283 | 6/1991 | Deli | 180/89.14 |
| 5,044,455 | 9/1991 | Tecco et al. | 180/89.13 |
| 5,090,774 | 2/1992 | Dolla | 296/188 |
| 5,109,939 | 5/1992 | Conaway et al. | 180/89.15 |
| 5,209,316 | 5/1993 | Bauer | 180/89.14 |
| 5,218,728 | 6/1993 | Lloyd et al. | 5/118 |
| 5,253,853 | 10/1993 | Conaway et al. | 267/256 |
| 5,257,680 | 11/1993 | Corcoran et al. | 188/129 |
| 5,403,028 | 4/1995 | Trimble | 280/284 |

FOREIGN PATENT DOCUMENTS 0158169  9/1982  Japan ................................. 296/190

*Primary Examiner*—David M. Mitchell
*Assistant Examiner*—Kia M. Robinson
*Attorney, Agent, or Firm*—Watts, Hoffmann, Fisher & Heinke Co., L.P.A.

[57] ABSTRACT

An apparatus for supporting a cab of a conventional over-the-highway truck or tractor vehicle relative to a vehicle frame which includes a pair of longitudinally extending rails and a transverse member interconnecting the rails. A pair of mounting assemblies are located near the front of the cab to resiliently and pivotally connect the cab to the rails. A pair of spaced apart spring members are located near the rear of the cab to support the cab for limited movement relative to the frame. A spaced pair of dampers extends between the cab and the frame to damp movement of the cab. The spaced dampers are located between the spring members. A centering damper is mounted between the cab and the frame to damp transverse movement of the cab. The centering damper is located between the spaced dampers.

6 Claims, 5 Drawing Sheets

HEAVY DUTY MOTOR VEHICLE CAB SUSPENSION

BACKGROUND OF THE INVENTION

1. Technical Field

The present invention relates generally to an over-the-highway truck or tractor vehicle having a frame and a cab. In particular, the present invention relates to a system for suspending the cab relative to the frame and for damping relative movement between them.

2. Description of the Prior Art

A conventional over-the-highway truck or tractor vehicle includes a frame for supporting an operator's cab. The frame is typically supported by load springs extending between the frame and the axles of the vehicle. Due to the relatively large load that such a vehicle transports, the load springs have a relatively high spring rate. Thus, any uneven road surface that the vehicle is operating over or any imbalance or untrueness of the tire and wheel assemblies of the vehicle results in a shock or vibration that is transmitted to the operator's cab.

Cab suspensions have been developed which include cab springs and dampers located between the vehicle frame and operator's cab to minimize transmission of such shock and vibration to the cab. Some developments in cab suspensions locate at least part of the suspension system near the rear of the cab and close to the center of gravity of the vehicle.

SUMMARY OF THE INVENTION

The present invention is directed to a cab suspension system with suspension components located as closely as possible to the corners of the cab to maximize the control of movement of the cab relative to the vehicle frame. An apparatus of the present invention provides a system for supporting a cab of a conventional over-the-highway truck or tractor vehicle on a vehicle frame. The frame includes a pair of longitudinally extending rails and transverse members interconnecting the rails.

The apparatus includes a pair of mounting assemblies located near the front end of the cab. Each mounting assembly resiliently and pivotally connects a portion of the front end to a respective one of the rails. Each of the mounting assemblies includes a cab bracket portion and a frame bracket portion with an interposed elastomeric bushing. A shaft interconnects the cab bracket portion to the elastomeric bushing of the frame bracket portion. The elastomeric bushings and shafts extend longitudinally of the vehicle so that the bushings permit limited pivotal movement of the cab about a transverse axis.

A spaced pair of spring members is located near the rear end of the cab. Each spring member extends between the cab and the frame to support the rear end of the cab for limited pivotal movement relative to the frame. A spaced pair of first upright dampers extends between the cab and the frame to damp vertical movement of the rear end of the cab. The upright dampers are located between the spring members. A centering damper is mounted between the cab and the frame to damp transverse movement of the cab. The centering damper is located between the upright dampers.

Each of the spring members is connected to a respective end of a transverse member at a location outboard of the rails. Preferably, each of the spring members extends in a direction substantially normal to the rails. In one embodiment, each of the spring members is a fluid spring and a mechanism is provided to actively control the pressure in the spring members. In another embodiment, each spring member is a coil spring.

A lower end of each of the upright dampers is connected to the transverse member at a location above a respective frame rail. Each upright damper has an upper end connected to the cab at a location transversely outward of a lower damper end. The centering damper includes a housing and a pair of springs, each of which acts on an opposite side of the housing to bias the cab to a laterally centered position relative to the frame.

DESCRIPTION OF PREFERRED EMBODIMENT

Figure 1:
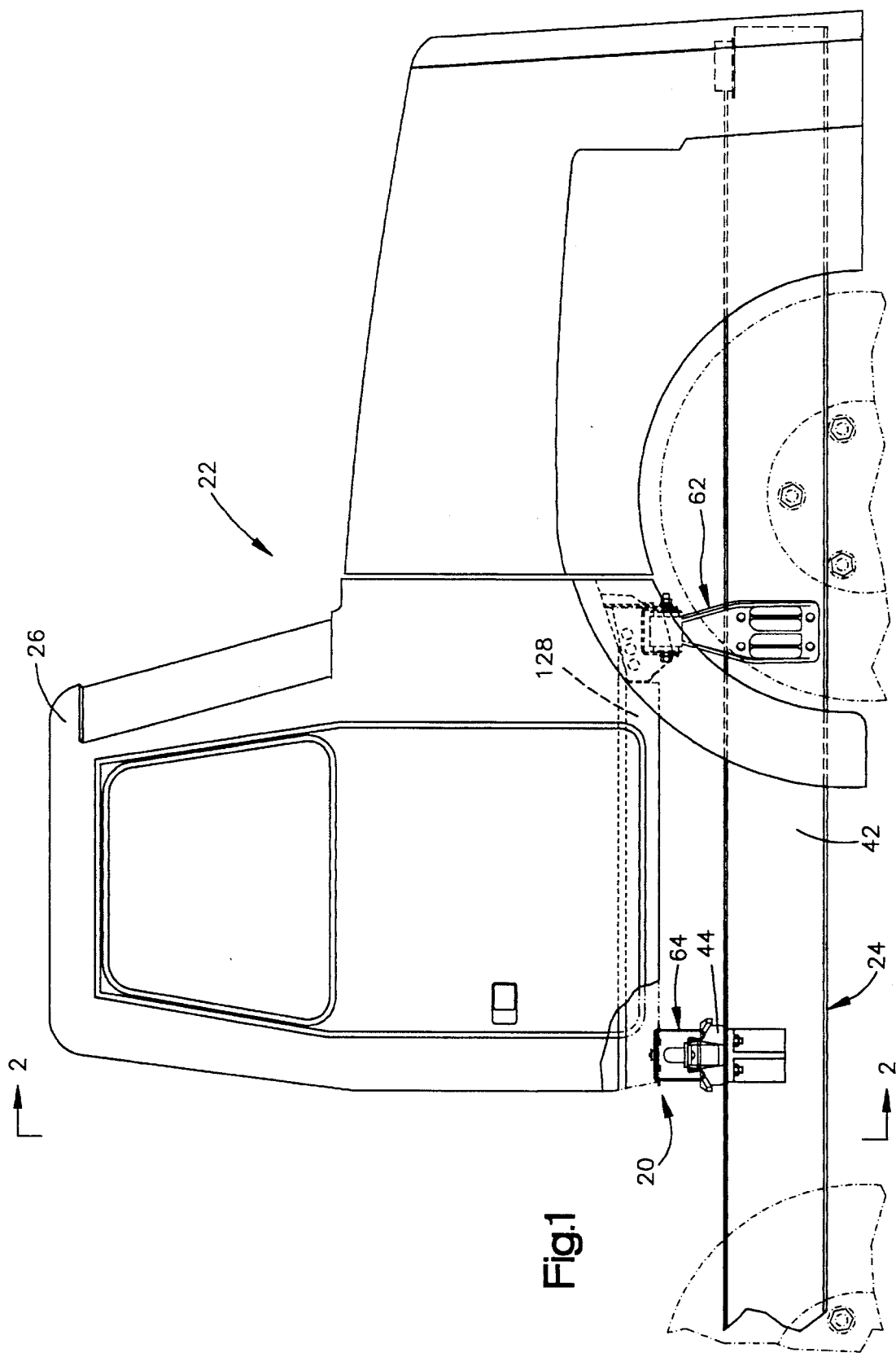
FIG. 1 is a side elevational view of a portion of a conventional over-the-highway tractor having a cab suspension system embodying the present invention.

A suspension system 20 for use on a conventional over-the-highway truck or tractor vehicle 22 is illustrated in FIG. 1. The vehicle 22 includes a frame 24 to support an operator's cab 26. The frame 24 includes a pair of longitudinal, or fore and aft, extending rails 42 and a transverse member 44 (FIG. 2) is positioned on and interconnects the rails. The transverse member 44 extends laterally beyond the rails 42 such that the length of the transverse member corresponds to approximately the width of the cab 26. The transverse member 44 is located under a rearward portion of the cab 26.

The suspension system 20 supports the cab 26 for limited movement relative to the frame 24. The suspension system 20 also damps movement of the cab 26 relative to the frame 24. The suspension system 20 includes a spaced, mirror image, pair of mounting assemblies 62 located under a forward portion of the cab 26, as illustrated in FIG. 1. The system 20 also includes a spring/damper system 64 located under a rearward portion of the cab.

Figure 4:
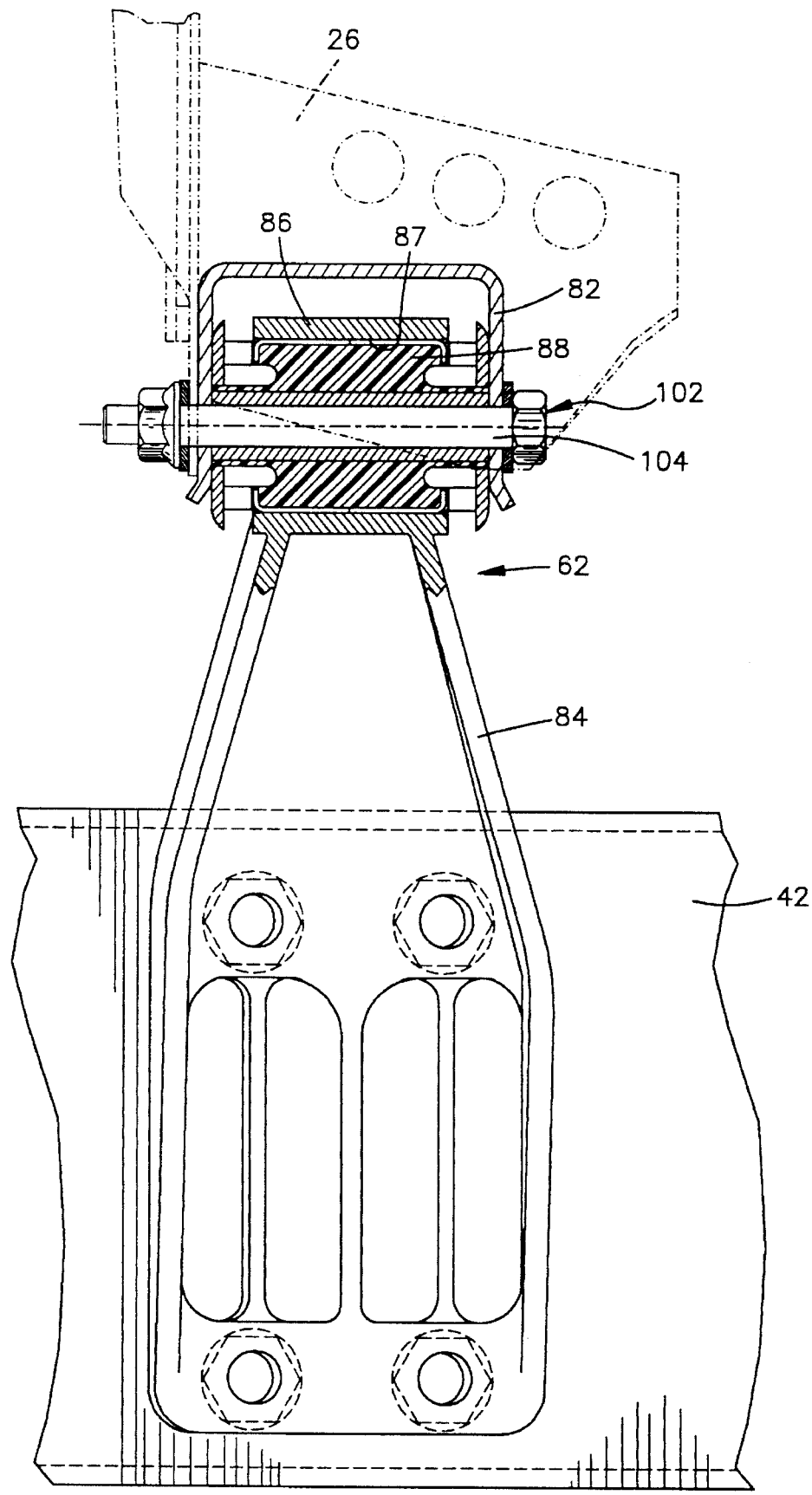
FIG. 4 is an enlarged view, partly in section, of a cab mounting assembly.

The mounting assemblies 62 resiliently and pivotably connect respective sides of the forward portion of the cab 26 to the rails 42. Each mounting assembly 62 (FIG. 4) includes a cab bracket portion 82 which is fixed to the cab 26 in a suitable manner, such as by welds. A frame bracket portion 84 of the mounting assembly 62 is connected to the rail 42 of the frame 24 by suitable means, such as threaded fasteners. The frame bracket portion 84 includes an upper end portion 86, as viewed in FIG. 4, with a bore 87 which receives an elastomeric bushing 88.

A bolt 102 having a shaft 104 extends coaxially through the bushing 88 and the bore 87 to interconnect the cab bracket portion 82 with the frame bracket portion 84. The bushing 88 and the shaft 104 extend longitudinally of the vehicle 22 in a direction substantially parallel to the rails 42. Thus, each of the mounting assemblies 62 permits a limited amount of pivoting action of the cab 26 relative to the frame 24 about a transverse axis. Each mounting assembly 62 also permits a limited amount of rolling and transverse movement of the cab 26 relative to the frame 24 in a direction transverse to the rails 42.

Figure 2:
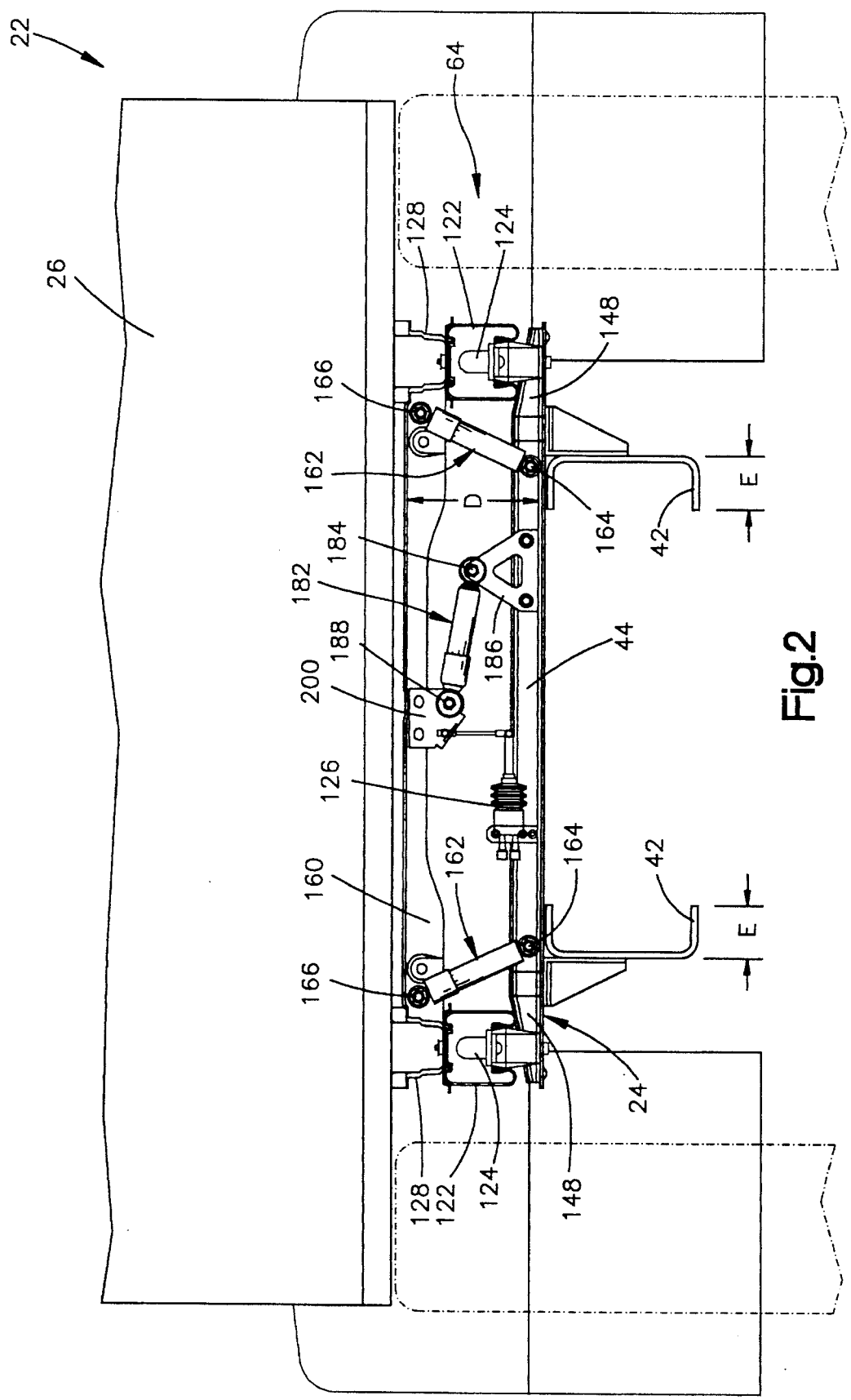
FIG. 2 is a fragmentary rear elevational view on an enlarged scale of the cab and suspension system of FIG. 1, as seen from the plane indicated by the line 2—2 in FIG. 1.
Figure 3:
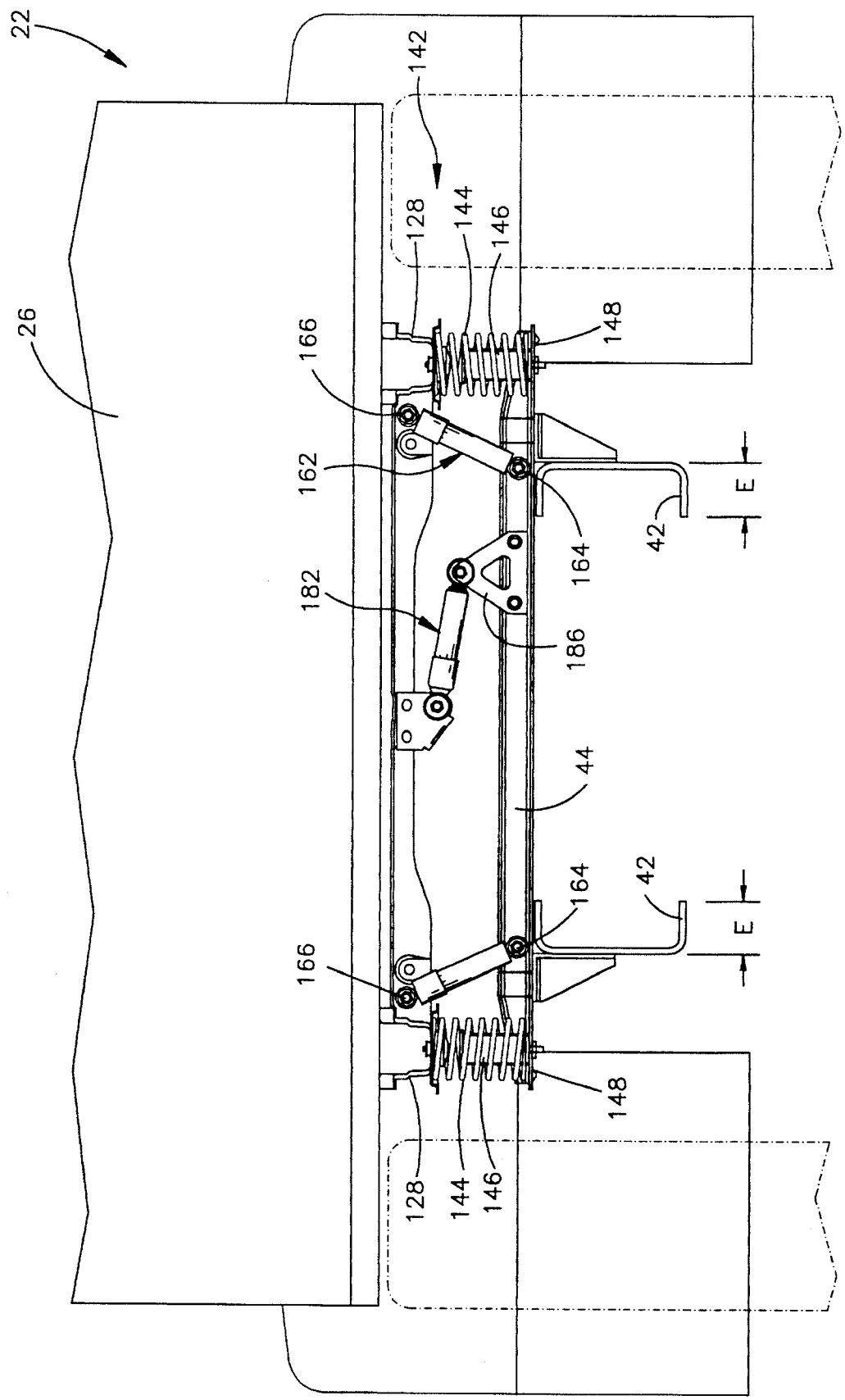
FIG. 3 is a view similar to FIG. 2 illustrating an alternate embodiment of the cab suspension system.

Two alternate embodiments of the spring/damper portion 64, 142 of the suspension system 24 are illustrated in FIGS. 2 and 3. While the structures are different, the function of the two embodiments of the spring/damper portion 64, 142, is the same. The embodiment, illustrated in FIG. 2, of the spring/damper portion 64 includes a pair of air springs 122 and a pair of vertical travel limits 124 in the form of elastomeric bumpers. Pressure within each of the air springs 122 is monitored and established by a controller 126. The controller 126 monitors the relative position or distance D between the cab 26 and the frame 24, and controls fluid pressure in the air springs 122 as a function of the relative distance between the cab and the transverse member 44. The embodiment illustrated in FIG. 3 of the spring/damper portion 142 includes a pair of coil springs 144 and vertical travel limits 146 respectively extending coaxially within the springs.

Each pair of springs 122, 144 is spaced apart transversely along the transverse member 44. Each of the springs 122, 144 is located between the transverse member 44 and a respective longitudinally extending support 128 on the bottom or underfloor of the cab 26. Each spring 122, 144 is located substantially as far as possible outboard on respective elements in the form of cantilevered outboard end portions 148 of the transverse member 44. Thus, the springs 122, 144 are located as close to corners at the rear of the cab 26 as is feasible. With the described positioning springs 122, 144 of relatively light weight and relatively lower spring rates can be used to offer maximized control of the position and movement of the cab 26 relative to the frame 24.

A transversely extending cab frame member 160 is located under the cab 26. A pair of laterally spaced apart upright dampers 162 are connected between the transverse member 44 and cab frame member 160. The upright dampers 162 damp and control primarily vertical movement of the cab 26 relative to the frame 24. The upright dampers 162 are shock absorbers which are located between the springs 122, 144 as upright dampers 162 is located as close as is feasible to an associated spring to maximize damping at each rearward corner of the cab 26.

A lower end 164 of each upright damper 162 is connected to the transverse member 44 above a respective rail 42 at a location substantially within the lateral extent E of the rail. An upper end 166 of each upright damper 162 is located transversely or laterally outward of the location of the bottom end portion 164 outside of the lateral extent E of the rails 42. Such a canted orientation of the upright dampers 162 modulates a portion of rolling and/or transverse movement of the cab 26 relative to the frame 24.

Figure 5:
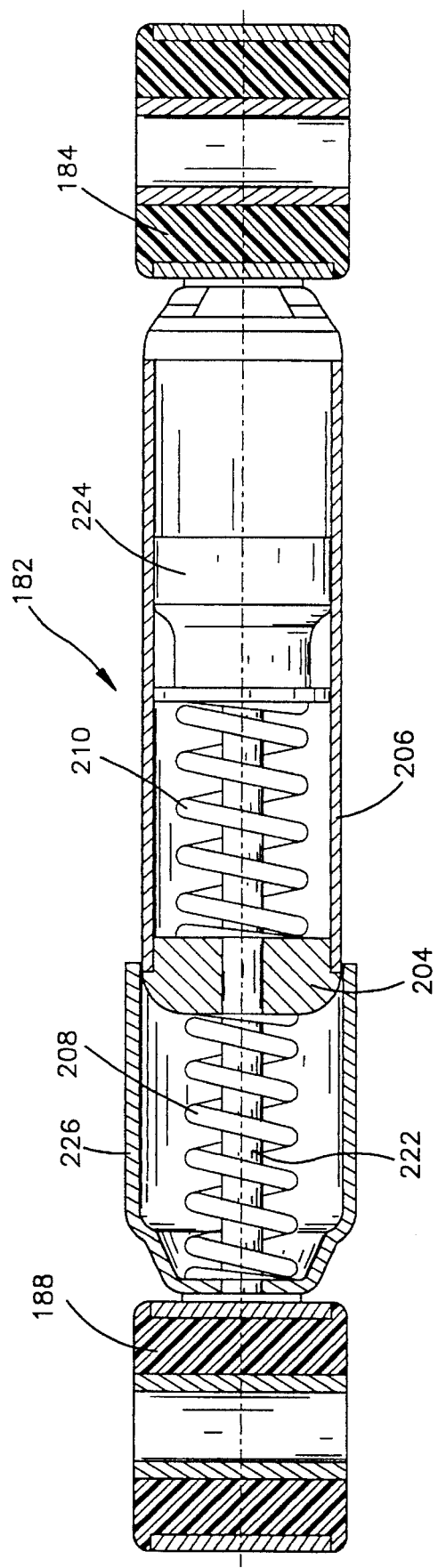
FIG. 5 is an enlarged cross-sectional view of a centering damper.

A lateral or centering damper 182 is located between the upright dampers 162. The lateral damper 182 controls a relatively large amount of rolling and/or transverse movement of the cab 26 relative to the frame 24 by damping and biasing the cab to a neutral or centered position relative to the frame. A lower or right end 184 (FIGS. 2 and 5) of the centering damper 182 is fixed to a bracket 186 connected to the transverse member 44. An upper or left end 188 of the centering damper 182 is pivotally connected to a bracket 200 fixed to the cab frame member 160.

The centering damper 182 includes an annular end cap 204 fixed to a cylindrical housing 206. Coil springs 208, 210 are located on either side of the end cap 204. The spring 208 is located coaxially around a damper rod 222 that extends from the upper end 188 through the end cap 204. The rod 222 is connected to a damper piston 224 which reciprocates within and relative to the housing 206 to damp movement equally in either direction the rod 222.

A tubular cover 226 extends from the end 188 to a remote portion which is telescoped over and reciprocatable relative to the housing 206. The spring 208 is interposed between and engages the cover 226 and the end cap 204. The spring 210 is located coaxially about the rod 222 and is interposed between and engages the end cap 204 and the piston 224.

The spring rate of the springs 208, 210 are equal and act on opposite sides of the end cap 204. The centering damper 182 biases the cab 26 to a transversely neutral or centered position relative to the frame rails 42. The lateral damper 182 also serves as a fluid damper or shock absorber to damp rolling and/or lateral movements of the cab 26 relative to the rails 42.

From the above description of preferred embodiments of the invention, those skilled in the art will perceive improvements, changes and modifications. Such improvements, changes and modifications within the skill of the art are intended to be covered by the appended claims.

Having described at least one preferred embodiment of the invention, what is claimed is:

1. In a conventional over-the-highway truck or tractor having a frame including at least two fore and aft extending rails and a transverse member interconnecting the rails and a cab mounted on the frame behind an engine, an improved cab suspension for enhancing ride quality comprising:

a spaced pair of mounting assemblies connecting a forward portion of the cab to the frame rail for limited pivotal movement about an axis transverse of the rails;

a pair of spaced apart springs interposed between and connected to a rearward portion of the cab and to the transverse member outboard of the rails for modulating pivotal motion of the cab relative to the frame and about the axis;

a pair of spaced apart motion dampers interposed between and directly connected to the cab and to the transverse member at locations between the pair of springs;

the motion dampers being oppositely canted at acute angles relative to the frame;

the motion dampers interconnecting the cab and frame to damp and limit relative cab and frame movement both toward and away from one another; and, a centering damper interposed between and connected to the cab and directly to the frame transverse member, the centering damper being between the motion dampers and adapted to bias the cab toward a transversely centered position relative to the frame rails.

2. The apparatus in claim 1 wherein each of said spring members extends in a direction substantially normal to the rails.

3. The apparatus in claim 1 wherein each of said spring members is a fluid spring and further includes a mechanism for actively controlling the pressure in the spring members.

4. The cab suspension of claim 1 wherein said centering damper includes a housing and a pair of springs acting on opposite sides of said housing to bias the cab to a transversely centered position relative to the frame.

5. The cab suspension of claim 1 wherein the springs are air springs.

6. The cab suspension of claim 1 wherein the springs are coil springs.

* * * * *